(12) United States Patent
Akiyama et al.

(10) Patent No.: US 7,153,906 B2
(45) Date of Patent: Dec. 26, 2006

(54) RESIN COMPOSITION FOR A BATTERY CASE FOR SECONDARY BATTERY

(75) Inventors: Yoshikuni Akiyama, Sodegaura (JP); Minoru Sakata, Sodegaura (JP)

(73) Assignee: Asahi Kasei Kabushiki Kaisha (JP)

( * ) Notice: Subject to any disclaimer, the term of this patent is extended or adjusted under 35 U.S.C. 154(b) by 0 days.

(21) Appl. No.: 10/132,957

(22) Filed: Apr. 26, 2002

(65) Prior Publication Data

US 2003/0207993 A1 Nov. 6, 2003

(51) Int. Cl.
*C08L 53/02* (2006.01)
*C08L 23/10* (2006.01)

(52) U.S. Cl. ......................... 525/98; 525/338
(58) Field of Classification Search ............ 525/89, 525/338, 98
See application file for complete search history.

(56) References Cited

U.S. PATENT DOCUMENTS

| | | | | |
|---|---|---|---|---|
| 4,871,805 | A | 10/1989 | Shimomura et al. | 525/98 |
| 5,378,760 | A * | 1/1995 | Modic et al. | 525/71 |
| 5,750,612 | A * | 5/1998 | Zyagawa et al. | 524/451 |
| 6,214,934 | B1 * | 4/2001 | Moriya et al. | 525/89 |
| 6,310,138 | B1 * | 10/2001 | Yonezawa et al. | 525/88 |

FOREIGN PATENT DOCUMENTS

| | | |
|---|---|---|
| DE | 19752658 | 6/1998 |
| EP | 0 994 153 A1 | 4/2000 |
| JP | A-63-156842 | 6/1988 |
| JP | A-6-287364 | 10/1994 |
| JP | A-8-132468 | 5/1996 |
| JP | A-8-195188 | 7/1996 |
| JP | A-9-120801 | 5/1997 |
| JP | A-10-110069 | 4/1998 |
| JP | A-11-31483 | 2/1999 |
| JP | A-11-40113 | 2/1999 |
| JP | A-2000-58007 | 2/2000 |
| JP | A-2000-182571 | 6/2000 |
| JP | A-2001-294745 | 10/2001 |
| JP | 2002063873 | 2/2002 |
| WO | WO 97/01600 | 1/1997 |

OTHER PUBLICATIONS

German Office Action issued Nov. 25, 2003 in the German counterpart (original and English translation).

* cited by examiner

*Primary Examiner*—Jeffrey Mullis
(74) *Attorney, Agent, or Firm*—Dickstein, Shapiro, LLP.

(57) ABSTRACT

The invention relates to a resin composition for a battery case for secondary battery, comprising:
  (a) about 100 parts by weight of a polypropylene type resin having a density of propylene polymer portion of about 0.905 g/cm$^3$ or more and an MFR of about 0.1 to 12, composing a matrix phase,
  (b) about 0.5 to 10 parts by weight of component (b-1) or (b-2), composing a dispersed phase polymer, and
  (c) a hydrogenated block copolymer obtained by hydrogenating a block copolymer; said hydrogenated block copolymer composing a boundary surface between the component a) and the component (b); wherein
(b-1) is a hydrogenated block copolymer having a number average molecular weight of about 100,000 or more, in terms of polystyrene, and
(b-2) is a high-density polyethylene having a density of about 0.940 g/cm$^3$ or more.

10 Claims, No Drawings

RESIN COMPOSITION FOR A BATTERY CASE FOR SECONDARY BATTERY

BACKGROUND OF THE INVENTION (1) Field of the Invention

The present invention relates to a resin composition excellent in resistance to thermal creep, resistance to water vapor permeation and resistance to impact, which is molded or formed into a battery case for secondary battery (including battery cases for enclosed secondary battery).

(2) Description of the Related Art

Secondary batteries (including enclosed secondary batteries) known to include lead storage batteries, nickel-cadmium batteries, nickel-hydrogen batteries and the like are widely used as power sources for vehicles (e.g. automobiles), various electric appliances and industrial machineries and tools. There has been a growing demand for them in recent years. With the growing demand, the batteries themselves have been improved in their performances, their battery cases have been miniaturized and lightened, and the electric capacity of the batteries has been increased. Therefore, there is a need for the replacing the material for the battery cases with resin materials which are resistant to change in shape, such as design variation and thinning and lightening. Moreover, in order to improve the battery performance, a resin material which has excellent mechanical strength, resistance to water vapor permeation and heat resistance is required.

In a battery case for secondary battery made of a resin, there have been used, for example, ABS resins and modified polyphenylene ether resins from the viewpoint of moldability and heat resistance. These resins, however, are poor in resistance to water vapor permeation and hence have a fatal defect in that water contained in an electrolytic solution in the secondary battery or a separator permeates the battery case for secondary battery during long-term use. As a result, the concentration of the electrolytic solution varies leading to the deterioration of battery performance.

In addition, the ABS resins and the modified polyphenylene ether resins are poor in chemical resistance. These materials, therefore, have a disadvantage in that they cannot be used for a battery case for secondary battery used in automobiles for a long period of time because of their low resistance to chemicals such as automotive oil.

In order to solve the above problems, JP-A-8-195188 proposes a battery case for enclosed secondary battery made of a resin composition comprising a crystalline polyolefin resin and a polyphenylene ether type resin. JP-A-9-120801 has proposed a battery case for enclosed secondary battery obtained by the use of a polymer alloy comprising a polyphenylene ether resin and a polyolefin resin. Re-publicized International Publication No. WO97/01600 discloses that a resin composition comprising a crystalline polyolefin resin and a polyphenylene ether resin, wherein the polyphenylene ether resin is dispersed in a specific form in a crystalline polypropylene resin, can be utilized as a material for a battery case for secondary battery because of its excellent resistance to thermal creep and resistance to water vapor permeation. JP-A-2000-58007 discloses that a resin composition comprising a polyphenylene ether type resin and a crystalline polypropylene having a specific structure can be utilized as a material for a battery case for enclosed secondary battery.

As to a resin composition for battery case which comprises a crystalline polypropylene type resin, JP-A-6-287364 discloses that the degree of shrinkage and deformation of a composition comprising a polypropylene type resin and talc with a specific particle size is low after its molding or forming. JP-A-8-132468 proposes a polypropylene battery case comprising a polypropylene resin and a slight amount of talc. JP-A-11-31483 proposes a battery case for enclosed electrochemical battery, produced from a composition having a crystallinity of 55 to 65% and comprising at least 95 wt % of a polypropylene and the balance of a propylene-ethylene copolymer. JP-A-2000-182571 proposes a material for battery case which comprises a blend of propylene, an α-olefin block copolymer and an ethylene/α-olefin copolymer and is excellent in the transparency.

These battery cases for secondary battery obtained from the resin compositions described above, however, contain a large proportion of one or more components other than a crystalline polypropylene which are added in the preparation of a polymer alloy. Therefore, it was difficult to maintain the excellent resistance to water vapor permeation of the crystalline polypropylene in the final resin composition at a high level.

SUMMARY OF THE INVENTION

The goal of the present invention is to provide a material that (1) permits retention of the high resistance to water vapor permeation and the high resistance to thermal creep of crystalline polypropylene itself and (2) is free from brittleness, which is the defect of a battery case for secondary battery made of highly crystalline polypropylene type resin alone.

Inventors of the present invention discovered that a resin composition comprising about 100 parts by weight of a polypropylene type resin as a matrix and about 10 parts by weight or less of a dispersed phase component is useful as a material for a battery case for secondary battery, from the viewpoint of the resistance to water vapor permeation and the resistance to thermal creep. In addition, the inventors note that from the technical viewpoint of impact strength improvement, the following resin composition is effective: a resin composition having a morphology in which (1) a hydrogenated block copolymer is a component forming a boundary phase between the matrix and the dispersed phase, wherein the matrix is polypropylene type resin and (2) the boundary phase contains inside a polymer as a dispersed phase component. Consequently, the present inventors found that the above-mentioned goal of the present invention can be achieved by using a crystalline polypropylene with a specific density and MFR (melt flow rate) as the matrix phase and either (1) using a hydrogenated block copolymer having a specific high molecular weight as a polymer forming both a boundary phase to the matrix, and a dispersed phase component at the same time, wherein the matrix is polypropylene type resin, or (2) using a hydrogenated block copolymer as a polymer forming a boundary phase between the polypropylene type resin of the matrix and a dispersed phase, and a high-density polyethylene as a polymer of the dispersed phase component contained within the boundary phase.

That is, the present invention relates to a resin composition for a battery case for secondary battery, comprising:

(a) about 100 parts by weight of a polypropylene type resin having a density of propylene polymer portion of about 0.905 g/cm$^3$ or more and an MFR of about 0.1 to 12 g/10 min, composing a matrix phase, (b) about 0.5 to 10 parts by weight of component (b-1) or (b-2), composing a dispersed phase polymer, and (c) a hydrogenated block copolymer obtained by hydrogenating a block copolymer comprising, at least, two polymer blocks A and one polymer block B: A mainly comprising vinyl aromatic compound units, and B mainly comprising conjugated diene compound units; said hydrogenated block copolymer composing a boundary surface between the component (a) and the component (b); wherein (b-1) is a hydrogenated block copolymer having a number average molecular weight of about 100,000 or more, in terms of polystyrene, as measured by gel permeation chromatography (GPC), and is obtained by hydrogenating a block copolymer comprising at least two polymer blocks A which mainly comprising vinyl aromatic compound units and at least one polymer block B which mainly comprising conjugated diene compound unit(s), wherein content of the bonded vinyl aromatic compound units being about 20 to 55 wt %, and (b-2) is a high-density polyethylene having a density of about 0.940 g/cm$^3$ or more.

PREFERRED EMBODIMENT OF THE INVENTION

The present invention is explained below in detail.

The polypropylene type resin (a) used in the present invention is selected from those having a density and a melt flow rate (MFR) (among the characteristics of polypropylene type resins in a broad sense) within the specific ranges, respectively, in order to attain the effects of the present invention, high resistance to thermal creep and high resistance to water vapor permeation.

In general, suitable polypropylene type resins include, but are not limited to, (1) crystalline propylene homopolymers and (2) crystalline propylene-ethylene block copolymers having a crystalline propylene homopolymer portions obtained in the first step of the polymerization and a propylene-ethylene random copolymer portion(s) obtained by copolymerizing propylene, ethylene and/or at least one other α-olefins (e.g. butene-1 or hexane-1, etc.) in the second or later step in the polymerization. The polypropylene type resins also include the mixtures of the crystalline propylene homopolymer and the crystalline propylene-ethylene block copolymer. The crystalline propylene-ethylene block copolymer therein is usually the one having an ethylene unit content of 1 to 30 wt %.

A process for producing the polypropylene type resin usually comprises polymerization at a polymerization temperature of about 0 to 100° C. and under a polymerization pressure of about 3 to 100 atmospheres in the presence of an alkylaluminum compound and a titanium trichloride catalyst or a titanium halide catalyst supported on a carrier such as magnesium chloride. In this case, a chain transfer agent such as hydrogen may be added in order to control the molecular weight of the polymer. As a polymerization method, either a batch process or a continuous process may be adopted. It is also possible to choose the polymerization method from solution polymerization, slurry polymerization and the like in a solvent such as butane, pentane, hexane, heptane, octane or the like. In addition, bulk polymerization in a monomer(s) in the absence of a solvent, vapor phase polymerization in a gaseous monomer(s), etc. may be employed.

Besides the above-mentioned polymerization catalyst, an electron-donating compound, as a third component, may be used as an internal donor component or an external donor component in order to improve the isotacticity of the resulting polypropylene and the polymerization activity. Well-known electron-donating compound(s) including but are not limited to, for example, ester compounds such as ε-caprolactam, methyl methacrylate, ethyl benzoate, methyl toluate, etc.; phosphites such as triphenyl phosphite, tributyl phosphite, etc.; phosphoric acid derivatives such as hexamethylphosphoric triamide, etc.; alkoxyester compounds; aromatic monocarboxylic acid esters and/or aromatic alkylalkoxysilanes; aliphatic hydrocarbon alkoxysilanes; various ether compounds; and various alcohols and/or various phenols, may be used as an electron-donating compound in the present invention.

The density of the propylene polymer portion of the polypropylene type resin used in the present invention is preferably about 0.905 g/cm$^3$ or more, more preferably about 0.905 to 0.925 g/cm$^3$, most preferably about 0.905 to 0.915 g/cm$^3$, for improving the resistance to thermal creep and the resistance to water vapor permeation. When the density is less than about 0.905 g/cm$^3$, the resulting material for battery case has a low stiffness, a low resistance to thermal creep and an insufficient resistance to water vapor permeation.

As to a method for measuring the density of the propylene polymer portion, the density can easily be measured by an underwater replacement method prescribed in JIS K-7112. When the polypropylene type resin is a copolymer comprising propylene as a main component and an α-olefin, the components of this polymer are extracted from the copolymer with a solvent such as hexane, and the density of the remaining propylene polymer portion can easily be measured by the above-mentioned underwater replacement method prescribed in JIS K-7112. The density of the propylene polymer portion in the resin composition can be determined by dissolving the whole composition in hot xylene, cooling the resulting solution to a room temperature, subjecting the residual resin composition to the extraction with a good solvent for the hydrogenated block copolymer, such as chloroform, separating the propylene polymer portion from the remaining polypropylene type resin by the separating method described above, and measuring the density of the propylene polymer portion by the underwater replacement method prescribed in JIS K-7112.

In the present invention, it is effective to increase the density of the polypropylene type resin by adding a known nucleating agent(s). Any nucleating agent may be used so long as it improves the crystallinity of the polypropylene type resin. Typical examples of the nucleating agent include but are not limited to, organic nucleating agents such as metal salts of aromatic carboxylic acids, sorbitol derivatives, organic phosphates, aromatic amide compounds, etc.; and inorganic nucleating agents such as talc, etc. The nucleating agent is not limited to the above-mentioned examples.

The MFR (according to JIS K-6758) of the polypropylene type resin used in the present invention is preferably about 0.1 to 12 g/10 min, more preferably about 0.1 to 10 g/10 min, most preferably about 0.1 to 5 g/10 min, for improving the resistance to thermal creep and the resistance to water vapor permeation. When the MFR is less than about 0.1 g/10 min, the resin composition has a low molding or forming workability as a material for battery case. When the MFR is more than about 12 g/10 min, although the molding or forming workability is improved, the resistance to thermal creep and the impact resistance are undesirably deteriorated.

The crystalline polypropylene type resin may be any crystalline polypropylene type resin that have a density and an MFR within the above-mentioned characteristic ranges, respectively, regardless of the production method therefor.

In addition to the crystalline polypropylene type resins as described above, the crystalline polypropylene type resins may be known modified crystalline polypropylene type resins obtained by reacting the crystalline polypropylene type resin and an α,β-unsaturated carboxylic acid or a derivative thereof, in a molten, solution or slurry state at a temperature of about 80 to 300° C. in the presence or absence of a free-radical initiator so that the α,β-unsaturated carboxylic acid or derivative thereof is grafted or added in a proportion of about 0.01 to 10 wt %. In addition, mixtures of (1) the crystalline polypropylene type resin described above and (2) the modified crystalline polypropylene type resin may be used at any mixing ratio.

Next, the component (b-1) or (b-2) forming the dispersed phase (b) of the resin composition of the present invention is explained below in detail.

The hydrogenated block copolymer of the component (b-1) forming the dispersed phase according to the present invention, i.e., the hydrogenated block copolymer obtained by hydrogenating a block copolymer comprising at least two polymer blocks A mainly comprising vinyl aromatic compound units and at least one polymer block B mainly comprising conjugated diene compound units, is necessary in order to impart the impact resistance to a battery case for secondary battery (including battery cases for enclosed secondary battery). The structure of the hydrogenated block copolymer of the component (b-1) may be the structure obtained by hydrogenating a block copolymer having a structure such as A-B-A, A-B-A-B, (A-B-)$_4$—Si, A-B-A-B-A or the like, wherein A denotes a polymer block mainly comprising vinyl aromatic compound units, and B denotes a polymer block mainly comprising conjugated diene compound units. The content of the vinyl aromatic compound units in the polymer block A is at least about 70 wt %, and the content of the conjugated diene compound units in the polymer block B is at least about 70 wt %.

Such a hydrogenated block copolymer of component (b-1) is a block copolymer obtained by reducing the proportion of olefinically unsaturated bonds originating from the conjugated diene compound units in a block copolymer having the above-exemplified structure to about 50% or less, preferably about 30% or less, more preferably about 10% or less, by hydrogenation.

In the polymer block A mainly comprising vinyl aromatic compound units and the polymer block B mainly comprising conjugated diene compound units, the distribution of the vinyl aromatic compound units or the conjugated diene compound units in molecular chains, respectively, may be a random distribution, a tapered distribution (a distribution in which the amount of the monomer component units increases or decreases along the molecular chain), a distribution as a partial block, or any combination thereof. The number of the polymer blocks A mainly comprising said vinyl aromatic compound units is two or more, and the number of the polymer blocks B mainly comprising said conjugated diene compound units is one or more. The polymer blocks of each kind may have the same structure or different structures.

As the vinyl aromatic compound for obtaining the polymer block A, one or more compounds may be selected from the group consisting of, for example, styrene, α-methylstyrene, vinyltoluene, p-tert-butylstyrene, and diphenylethylene and the like. Styrene is especially preferable. The content of vinyl aromatic compound units in the hydrogenated block copolymer used as the component (b-1) is about 20 to 55 wt %, preferably about 25 to 50 wt %, more preferably about 30 to 40 wt %.

When the content of the vinyl aromatic compound units is less than about 20 wt %, the stiffness of a battery case and the resistance to thermal creep are undesirably deteriorated. When the content is more than about 55 wt %, although the stiffness and the resistance to thermal creep are excellent, such a content is not desirable for overcoming a problem with the brittleness of a battery case. On the other hand, as the conjugated diene compound for obtaining the polymer block B, one or more compounds are selected from the group consisting of, for example, butadiene, isoprene, 1,3-pentadiene and 2,3-dimethyl-1,3-butadiene. Butadiene, isoprene and a combination thereof are especially preferable.

The microstructure in the polymer block B mainly comprising conjugated diene compound units can be arbitrarily chosen. For example, in a polymer block mainly comprising butadiene units, the content of 1,2-vinyl bonds is about 2 to 90%, preferably about 10 to 85%, more preferably about 35 to 85%. In a polymer block mainly comprising isoprene units, the total content of 1,2-vinyl bonds and 3,4-vinyl bonds is about 2 to 90%, preferably about 3 to 70%.

The hydrogenated block copolymer used as the component (b-1) should have a specific molecular weight as an important factor in a material for a battery case for secondary battery, in addition to the structure described above.

The specific molecular weight is as follows: the number average molecular weight should be about 100,000 or more, preferably about 130,000 or more, in terms of polystyrene, as measured by gel permeation chromatography (GPC). When the number average molecular weight is less than about 100,000, the resin composition has an insufficient impact resistance as a material for a battery case for secondary battery. In that case, in order to improve the impact resistance, a very large amount of the hydrogenated block copolymer should be incorporated into the resin composition. This incorporation is not desirable because it significantly deteriorates the resistance to water vapor permeation and resistance to thermal creep of the resin composition as a material for a battery case for secondary battery. In other words, since the high-molecular weight hydrogenated block copolymer with a specific molecular weight of the component (b-1) in the present invention directly forms a suitable boundary phase with the crystalline polypropylene type resin, i.e., the component (a) constituting the matrix, a boundary phase corresponding to the component (c) is formed without adding the hydrogenated block copolymer specified as the component (c). Accordingly, by blending a small amount of the high-molecular weight hydrogenated block copolymer of the component (b-1) alone with the polypropylene resin of the component (a), a suitable boundary phase and a suitable dispersed phase are formed to impart an excellent impact resistance. As a result, it becomes possible to blend a large amount of the crystalline polypropylene type resin as a matrix component. Thus, an important effect that the resistance to water vapor permeation and the resistance to thermal creep of the resin composition as a material for a battery case for secondary battery can be maintained at high levels, is brought about. However, the addition of another hydrogenated block copolymer as the component (c) is not prohibited herein. It is meant that it does not matter whether another hydrogenated block copolymer is added or not so long as the hydrogenated block copolymer as the boundary phase according to the present invention is formed between the component (a) and the component (b).

The hydrogenated block copolymer used as the component (b-1) in the present invention may be any hydrogenated block copolymer that has the characteristics described above, regardless of the production method therefor.

In addition to the hydrogenated block copolymers described above, the hydrogenated block copolymer used as the component (b-1) in the present invention may be known modified hydrogenated block copolymers obtained by reacting the hydrogenated block copolymer and an α,β-unsaturated carboxylic acid or a derivative thereof, in a molten, solution or slurry state at a temperature of about 80 to 350° C. in the presence or absence of a free-radical initiator so that the α,β-unsaturated carboxylic acid or derivative thereof is grafted or added in a proportion of about 0.01 to 10 wt %. Moreover, mixtures of the hydrogenated block copolymer described above and the modified hydrogenated block copolymer can be used at any mixing ratio.

The proportion of the hydrogenated block copolymer used as the component (b-1) is preferably about 0.5 to 10 parts by weight, more preferably about 1 to 10 parts by weight, most preferably about 1 to 7 parts by weight. When the proportion is less than about 0.5 part by weight, the impact resistance is not markedly improved. When the proportion is more than about 10 parts by weight, although the impact resistance is expected to be improved, the resistance to water vapor permeation and the resistance to thermal creep of the resin composition as a material for a battery case for secondary battery are undesirably deteriorated.

The high-density polyethylene (b-2) forming another kind of dispersed phase in the present invention can impart an excellent impact resistance when used in a small amount in combination with the hydrogenated block copolymer (c) described hereinafter which forms a boundary phase in the crystalline polypropylene type resin forming a matrix phase as the component (a). As a result, it becomes possible to blend a large amount of the crystalline polypropylene type resin as a matrix component. Thus, an important effect that the resistance to water vapor permeation and the resistance to thermal creep of the resin composition as a material for a battery case for secondary battery can be maintained at high levels, is obtained.

The high-density polyethylene (b-2) used in the present invention is an ethylene homopolymer or a copolymer of ethylene and an α-olefin. The α-olefins include, but are not limited to, 1-butene, 1-pentene, 1-hexene, 4-methyl-1-pentene, 1-octene, 1-decene, 1-dodecene, 1-tetradecene, 1-hexadecene, 1-octadecene, 1-eicosene, etc. The α-olefin unit content of the ethylene/α-olefin copolymer is about 10 mol % or less, preferably about 0.2 to 7 mol %. The density (ASTM D 1505) of the high-density polyethylene is about 0.940 g/cm$^3$ or more, and its melt flow rate (MFR: ASTM D 1238, about 190° C., load about 21.2 N) is usually about 0.01 to 50 g/10 min, preferably about 0.1 to 30 g/10 min, more preferably about 0.1 to 20 g/10 min. Such a high-density polyethylene can be produced, for example, by a low-pressure process using a Ziegler-Natta catalyst, a low-pressure process using a metallocene type catalyst, or a moderate-pressure process such as the Phillips process.

The proportion of the high-density polyethylene used as the component (b-2) is preferably about 0.5 to 10 parts by weight, more preferably about 1 to 10 parts by weight, most preferably about 1 to 7 parts by weight. When the proportion is less than about 0.5 part by weight, the impact resistance is not markedly improved. When the proportion is more than about 10 parts by weight, although the impact resistance is expected to be improved, the resistance to water vapor permeation and the resistance to thermal creep of the resin composition as a material for a battery case for secondary battery are undesirably deteriorated.

The hydrogenated block copolymer (c) forming a boundary phase between the high-density polyethylene, i.e., the component (b-2) of the dispersed phase according to the present invention and the crystalline polypropylene type resin (a). i.e., the matrix phase, is a hydrogenated block copolymer obtained by hydrogenating a block copolymer comprising at least two polymer blocks A mainly comprising vinyl aromatic compound units and at least one polymer block B mainly comprising conjugated diene compound units. The hydrogenated block copolymer (c) is a hydrogenated block copolymer obtained by hydrogenating a block copolymer having a structure such as A-B-A, A-B-A-B, (A-B-)$_4$—Si, A-B-A-B-A or the like, wherein A denotes a polymer block A mainly comprising vinyl aromatic compound units, and B denotes a polymer block B mainly comprising conjugated diene compound units. The content of the vinyl aromatic compound units in the polymer block A is at least about 70 wt %, and the content of the conjugated diene compound units in the polymer block B is at least about 70 wt %.

Such a hydrogenated block copolymer (c) is a block copolymer obtained by reducing the proportion of olefinically unsaturated bonds originating from the conjugated diene compound in a block copolymer having the above-exemplified structure to about 50% or less, preferably about 30% or less, more preferably about 10% or less, by hydrogenation.

In the polymer block A mainly comprising vinyl aromatic compound units and the polymer block B mainly of comprising conjugated diene compound units, the distribution of the vinyl aromatic compound units or the conjugated diene compound units in the molecular chain, respectively, may be a random distribution, a tapered distribution (a distribution in which the amount of the monomer component units increases or decreases along the molecular chain), a distribution as a partial block, or any combination thereof. The number of the polymer blocks mainly comprising said vinyl aromatic compound units is two or more, and the number of the polymer blocks mainly comprising said conjugated diene compound units is one or more. The polymer blocks of each kind may have the same structure or different structures.

The vinyl aromatic compound constituting the polymer block A may be one or more compounds selected from the group consisting of, for example, styrene, α-methylstyrene, vinyltoluene, p-tert-butylstyrene and diphenylethylene. Styrene is especially preferable. The content of the vinyl aromatic compound units in the hydrogenated block copolymer (c) is about 20 to 70 wt %, preferably about 25 to 60 wt %, more preferably about 30 to 50 wt %.

When the content of the vinyl aromatic compound units is less than about 20 wt %, the stiffness and the resistance to thermal creep of the resultant battery case for secondary battery are undesirably deteriorated. When the content is more than 70 wt %, although the stiffness and the resistance to thermal creep are improved, such a content is not desirable in terms of overcoming the problem with the brittleness of a battery case for secondary battery.

On the other hand, the conjugated diene compound constituting the polymer block B may be one or more compounds selected from the group consisting of, for example, butadiene, isoprene, 1,3-pentadiene and 2,3-dimethyl-1,3-butadiene. Butadiene, isoprene and a combination thereof are especially preferable.

The microstructure in the polymer block B composed mainly of units of a conjugated diene compound can be arbitrarily chosen. For example, in the polymer block mainly comprising butadiene units, the proportion of 1,2-vinyl bonds is about 2 to 90%, preferably about 10 to 85%, more preferably about 35 to 85%. In a polymer block mainly comprising isoprene units, the total proportion of 1,2-vinyl bonds and 3,4-vinyl bonds is about 2 to 90%, preferably about 3 to 70%.

The molecular weight as a number average molecular weight of the hydrogenated block copolymer (c), is usually about 20,000 to 1,000,000, preferably about 30,000 to 300,000, more preferably about 30,000 to 200,000, in terms of polystyrene, as measured by gel permeation chromatography (GPC).

The hydrogenated block copolymer (c) used in the present invention, may be any hydrogenated block copolymer that has the characteristics described above, regardless of the production method therefor.

In addition to the hydrogenated block copolymers described above the hydrogenated block copolymer (c) used in the present invention may be known modified hydrogenated block copolymers obtained by reacting the hydrogenated block copolymer and an $\alpha,\beta$-unsaturated carboxylic acid or a derivative thereof, in a molten, solution or slurry state at a temperature of about 80 to 350° C. in the presence or absence of a free-radical initiator so that the $\alpha,\beta$-unsaturated carboxylic acid or derivative thereof is grafted or added in a proportion of about 0.01 to 10 wt %. Moreover, the hydrogenated block copolymer (c) may also be the mixtures of the hydrogenated block copolymer described above and the modified hydrogenated block copolymer at any mixing ratio.

The proportion of the hydrogenated block copolymer (c) used as the boundary phase between the polypropylene type resin of the component (a) and the high-density polyethylene of the component (b-2) is preferably about 5 parts by weight or less, more preferably about 0.5 to 5 parts by weight, most preferably about 1 to 5 parts by weight. When the proportion is less than about 0.25 part by weight, the impact resistance is not markedly improved. When the proportion is more than about 5 parts by weight, although the impact resistance is expected to be improved, the resistance to water vapor permeation and the resistance to thermal creep of the resultant resin composition as a material for a battery case for secondary battery are undesirably deteriorated.

A method for confirming the presence of the hydrogenated block copolymer in the boundary phase of the resulting resin composition and the presence of the dispersed phase polymer in the resin composition can be easily carried out by the measurement using a transmission electron microscope. For example, a sample is stained by oxidation with a heavy metal compound such as ruthenium tetrachloride, and an ultra-thin slice is cut out of the sample with an ultramicrotome or the like and observed by a transmission electron microscope and photographed. From the developed photograph (magnification of for example×10,000 or more), the presence of the hydrogenated block copolymer and the dispersed phase polymer can be confirmed. In particular, the presence of the hydrogenated block copolymer of the boundary phase to the polypropylene type resin of the matrix in the resin composition according to the present invention is confirmed by the presence of a blackly stained portion in the photograph obtained by the electron microscope, owing to units of the hydrogenated conjugated diene compound.

In the present invention, the following additional components may, if necessary, be added besides the above-mentioned components so long as they do not mar the characteristics and the effects of the present invention: for example, antioxidants, metal deactivators, flame retardants (e.g. organic phosphoric ester type compounds, inorganic phosphorus compounds, aromatic halogen-containing flame retardants and silicone-based flame retardants), fluorine-containing polymers, plasticizers (e.g. oils, low-molecular weight polyethylenes, epoxidized soybean oil, poly(ethylene glycol)s and fatty acid esters), flame-retarding auxiliaries (e.g. antimony trioxide), weather resistance improving agents, light resistance improving agents, slip agents, inorganic or organic fillers and reinforcing materials (glass fiber, glass flakes, carbon fiber, polyacrylonitrile fiber, whisker, mica, talc, carbon black, titanium oxide, calcium carbonate, potassium titanate, wollastonite, electroconductive metal fiber and electroconductive carbon black), various colorants, and mold release agents.

A process for producing the resin composition of the present invention can be heat-melt-kneading processes using the above-mentioned components and a single-screw extruder, twin-screw extruder, roll, kneader, Brabender Plastograph, Banbury mixer or the like. Of these processes, the melt kneading process using a twin-screw extruder is the most preferable. Although the melt kneading temperature is not particularly limited, usually, it may be arbitrarily chosen from the temperatures in the range of about 180 to 300° C.

The resin composition to be molded or formed into a battery case for secondary battery (including battery cases for enclosed secondary battery) according to the present invention can be suitably used particularly in a battery case for lead storage battery, a battery case for nickel-hydrogen battery and a battery case for lithium ion battery. A method for molding or forming the resin composition is not particularly limited. It is possible to adopt molding or forming methods such as injection molding, blow molding, extrusion molding, sheet forming, film forming, thermoforming, rotary molding, laminated molding, etc. Finally, the resulting sheet, film or injection-molded article can be used as a battery case for secondary battery having the structure directly enveloping the electrodes and the electrolyte.

In the case where the battery case is composed of two or more parts (for example, a combination of the substantial container and the cover, or a combination of two or more battery cases connected to one another), these parts are joined together by adhesion, welding with heating, welding with vibrating, or the like. The adhesives used for the adhesion includes, for example, epoxy resin adhesives. The epoxy resin adhesives are the adhesives comprising a resin having an epoxy structure as a main skeleton, among which two-part adhesives composed of a principal agent and a curing agent are preferred.

EXAMPLES

Embodiments of the present invention are concretely explained below in the non-limiting examples.

Starting materials used in the examples are as follows.

Polypropylene Type Resins of the Component (a)

(a-1): a polypropylene resin having a density of 0.910 g/cm$^3$, a melt flow rate (230° C., 21.2 N load; hereinafter abbreviated as MFR) of 0.4 g/10 min and a molecular weight distribution (Mw/Mn) of 9.6.

(a-2): a polypropylene resin having a density of 0.906 g/cm$^3$, an MFR of 2.5 g/10 min and a molecular weight distribution (Mw/Mn) of 5.9.

(a-3): a polypropylene resin having a density of 0.910 g/cm$^3$, an MFR of 9.0 g/10 min and a molecular weight distribution (Mw/Mn) of 10.3.

(a-4): a polypropylene resin having a density of 0.902 g/cm$^3$, an MFR of 0.5 g/10 min and a molecular weight distribution (Mw/Mn) of 6.2.

(a-5): a polypropylene resin having a density of 0.908 g/cm³, an MFR of 16.3 g/10 min and a molecular weight distribution (Mw/Mn) of 6.1.

Hydrogenated Block Copolymers of the Component (b-1)

(b-1-1): a hydrogenated block copolymer having a structure of polystyrene-hydrogenated polybutadiene-polystyrene and having a content of bonded styrene units of 43%, a content of 1,2-vinyl bonds in the polybutadiene portion thereof of 78%, the hydrogenation rate of the polybutadiene portion thereof of 99.8% and a number average molecular weight of 216,000.

(b-1-2): a hydrogenated block copolymer having theructure of polystyrene-hydrogenated polybutadiene-polystyrene-hydrogenated polybutadiene and having a content of bonded styrene units of 53%, a content of vinyl bonds in the polybutadiene portion thereof of 42%, the hydrogenation rate of the polybutadiene portion thereof of 98.9% and a number average molecular weight of 174,000.

(b-1-3): a hydrogenated block copolymer having a structure of polystyrene-hydrogenated polybutadiene-polystyrene and having a content of bonded styrene units of 35%, a content of 1,2-vinyl bonds in the polybutadiene portion thereof of 43%, a hydrogenation rate of the polybutadiene portion thereof of 99.8% and a number average molecular weight of 192,000.

(b-1-4): a hydrogenated block copolymer having a structure of polystyrene-hydrogenated polybutadiene-polystyrene and having a content of bonded styrene units of 26%, a content of vinyl bonds in the polybutadiene portion thereof of 55%, a hydrogenation rate of the polybutadiene portion thereof of 99.2% and a number average molecular weight of 130,000.

(b-1-5): a hydrogenated block copolymer having a structure of polystyrene-hydrogenated polybutadiene-polystyrene-hydrogenated polybutadiene and having a content of bonded styrene units of 53%, a content of vinyl bonds in the polybutadiene portion thereof of 43%, a hydrogenation rate of the polybutadiene portion thereof of 97.4% and a number average molecular weight of 89,000, and (b-1-6): a hydrogenated block copolymer having a structure of polystyrene-hydrogenated polybutadiene-polystyrene and having a content of bonded styrene units of 25%, a content of vinyl bonds in the polybutadiene portion thereof of 55%, a hydrogenation rate of the polybutadiene portion thereof of 99.1% and a number average molecular weight of 91,000.

Polyethylenes of the Component (b-2)

(b-2-1): a high-density polyethylene having a density of 0.957 g/cm³ and a melt flow rate (190° C., 21.2 N load; hereinafter abbreviated as MFR) of 0.16 g/10 min, (b-2-2): a high-density polyethylene having a density of 0.969 g/cm³ and an MFR of 5 g/10 min, (b-2-3): a low-density polyethylene having a density of 0.917 g/cm³ and an MFR of 0.3 g/10 min.

Hydrogenated Block Copolymers of the Component (c)

(c-1): a hydrogenated block copolymer having a structure of polystyrene-hydrogenated polybutadiene-polystyrene and having a content of bonded styrene units of 30%, a content of vinyl bonds in the polybutadiene portion thereof of 45%, a hydrogenation rate of the polybutadiene portion thereof of 99.6% and a number average molecular weight of 51,000, and (c-2): a hydrogenated block copolymer having a structure of polystyrene-hydrogenated polybutadiene-polystyrene and having a content of bonded styrene units of 40%, a content of vinyl bonds in the polybutadiene portion thereof of 38%, a hydrogenation rate of the polybutadiene portion thereof of 99.1% and a number average molecular weight of 115,000.

Physical properties were evaluated as follows.

(1) Resistance to Water Vapor Permeation

A water vapor permeability test at 40° C. was carried out by the use of a sheet of 1 mm thick according to JIS K7129 to measure the water vapor permeability [g/(m²·24 Hr)].

(2) Izod Impact Strength

The impact strength [J/m] of a notched test specimen of 3.2 mm thick was measured at 23° C. according to ASTM D256.

(3) High-temperature Creep Strength

A time required for the strain elongation of a dumbbell specimen (4 mm wide, 1 mm thick and 70 mm long) to reach 20 mm was measured at a temperature of 80° C. under a load corresponding to a stress of 12.25 MPa between chucks 40 mm apart from each other with a creep tester (Model 145-B-PC, mfd. by Yasuda Seiki Seisakusho Ltd.).

(4) Confirmation of the Presence of the Boundary Phase Between the Polypropylene Type Resin and the Dispersed Phase A sample is stained by oxidation with a heavy metal compound such as ruthenium tetrachloride, and an ultra-thin slice is cut out of the sample with an ultramicrotome or the like and observed by a transmission electron microscope and photographed. Using the resulting 10,000-fold enlarged photograph, the presence of a hydrogenated block copolymer in the boundary phase between the polypropylene type resin of the matrix and the dispersed phase was investigated.

Examples 1 to 10 and Comparative Examples 1 to 10

A polypropylene type resin (a) and a hydrogenated block copolymer (b-1) were blended according to the recipe shown in Table 1, and melt-kneaded by means of a vent-port-equipped twin-screw extruder (ZSK-40, mfd. by WERNER & PFLEIDERER AG., Germany) adjusted to the temperature from 210 to 280° C., to obtain pellets. The pellets were fed to a screw in-line type injection molding machine adjusted to the temperature from 240 to 250° C. and injection-molded into test pieces for the Izod test and test pieces for the creep test at a mold temperature of 60° C. The performances of these test pieces were measured and the results thereby are shown in Table 1. Sheets for evaluating the resistance to water vapor permeation were formed with a heating press at 250° C.

Examples 11 to 20 and Comparative Examples 11 to 17

A polypropylene type resin (a), a polyethylene (b-2) and a hydrogenated block copolymer (c) were blended according to the recipe shown in Table 2, and melt-kneaded by means of a vent-port-equipped twin-screw extruder (ZSK-40, mfd. by WERNER & PFLEIDERER AG., Germany) adjusted to the temperature from 210 to 250° C., to obtain pellets. The pellets were fed to a screw in-line type injection molding machine adjusted to the temperature from 240 to 250° C. and injection-molded into test pieces for the Izod test and test pieces for the creep test at the mold temperature of 60° C. The performances of the test pieces were measured and the results thereby are shown in Table 2. Sheets for evaluating the resistance to water vapor permeation were formed with a heating press at 250° C.

TABLE 1

| | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| Component (a) (a-1) | Parts by weight | 100 | 100 | 100 | 100 | 100 | | | | | 100 |
| Component (a) (a-2) | Parts by weight | | | | | | 100 | 100 | 100 | | |
| Component (a) (a-3) | Parts by weight | | | | | | | | | 100 | |
| Component (a) (a-4) | Parts by weight | | | | | | | | | | |
| Component (a) (a-5) | Parts by weight | | | | | | | | | | |
| Component (b) (b-1-1) | Parts by weight | | | | | | 1.25 | 2.5 | 5 | | |
| Component (b) (b-1-2) | Parts by weight | | | | | | | | | 5 | 10 |
| Component (b) (b-1-3) | Parts by weight | 0.5 | 1.25 | 2.5 | 5 | | | | | | |
| Component (b) (b-1-4) | Parts by weight | | | | | 5 | | | | | |
| Component (b) (b-1-5) | Parts by weight | | | | | | | | | | |
| Component (b) (b-1-6) | Parts by weight | | | | | | | | | | |
| Water vapor permeability | [g/(m$^2$ · 24 Hrs)] | 0.10 | 0.11 | 0.12 | 0.12 | 0.12 | 0.11 | 0.12 | 0.12 | 0.12 | 0.14 |
| Izod impact strength | J/m | 69 | 150 | 180 | 230 | 280 | 51 | 78 | 101 | 70 | 167 |
| Resistance to thermal creep | (Hrs) | 300 or more | 300 or more | 300 or more | 300 or more | 300 or more | 182 | 178 | 168 | 276 | 300 or more |
| Presence of HTR in boundary phase | | Yes | Yes | Yes | Yes | Yes | Yes | Yes | Yes | Yes | Yes |

| | | Com. Ex. 1 | Com. Ex. 2 | Com. Ex. 3 | Com. Ex. 4 | Com. Ex. 5 | Com. Ex. 6 | Com. Ex. 7 | Com. Ex. 8 | Com. Ex. 9 | Com. Ex. 10 |
|---|---|---|---|---|---|---|---|---|---|---|---|
| Component (a) (a-1) | Parts by weight | 100 | | | 100 | 100 | 100 | 100 | | | 100 |
| Component (a) (a-2) | Parts by weight | | 100 | | | | | | | | |
| Component (a) (a-3) | Parts by weight | | | 100 | | | | | | | |
| Component (a) (a-4) | Parts by weight | | | | | | | | 100 | | |
| Component (a) (a-5) | Parts by weight | | | | | | | | | 100 | |
| Component (b) (b-1-1) | Parts by weight | | | | | | | | 1.25 | 1.25 | |
| Component (b) (b-1-2) | Parts by weight | | | | | | | | | | |
| Component (b) (b-1-3) | Parts by weight | | | | | | | | | | |
| Component (b) (b-1-4) | Parts by weight | | | | | | | | | | 15 |
| Component (b) (b-1-5) | Parts by weight | | | | | | | | | | |
| Component (b) (b-1-6) | Parts by weight | | | | 1.25 | 2.5 | 5 | 25 | | | |
| Water vapor permeability | [g/(m$^2$ · 24 Hrs)] | 0.11 | 0.11 | 0.11 | 0.11 | 0.11 | 0.11 | 0.28 | 0.19 | 0.12 | 0.25 |
| Izod impact strength | J/m | 34 | 17 | 13 | 32 | 31 | 30 | 82 | 131 | 143 | 260 |
| Resistance to thermal creep | (Hrs) | 300 or more | 180 | 140 | 300 or more | 300 or more | 300 or more | 118 | 127 | 64 | 22 |
| Presence of HTR in boundary phase | | No | No | No | Yes | Yes | Yes | Yes | Yes | Yes | Yes |

*HTR in the above table denotes a hydrogenated block copolymer.

TABLE 2

|  |  | Example 11 | Example 12 | Example 13 | Example 14 | Example 15 | Example 16 | Example 17 | Example 18 | Example 19 | Example 20 |
|---|---|---|---|---|---|---|---|---|---|---|---|
| Component (a) (a-1) | Parts by weight | 100 | 100 | 100 | 100 | 100 | 100 |  |  |  | 50 |
| Component (a) (a-2) | Parts by weight |  |  |  |  |  |  | 100 | 100 |  |  |
| Component (a) (a-3) | Parts by weight |  |  |  |  |  |  |  |  | 100 | 50 |
| Component (a) (a-4) | Parts by weight |  |  |  |  |  |  |  |  |  |  |
| Component (a) (a-5) | Parts by weight |  |  |  |  |  |  |  |  |  |  |
| Component (b) (b-2-1) | Parts by weight | 5 | 5 | 5 | 10 | 10 | 1 |  |  | 5 |  |
| Component (b) (b-2-2) | Parts by weight |  |  |  |  |  |  | 5 | 10 |  | 5 |
| Component (b) (b-2-3) | Parts by weight |  |  |  |  |  |  |  |  |  |  |
| Component (c) (c-1) | Parts by weight | 1.25 | 2.5 | 5 | 2.5 | 5 |  |  |  |  |  |
| Component (c) (c-2) | Parts by weight |  |  |  |  |  | 2 | 3 | 3 | 5 | 2 |
| Water vapor permeability | [g/(m² · 24 Hrs)] | 0.11 | 0.11 | 0.11 | 0.11 | 0.12 | 0.11 | 0.11 | 0.11 | 0.11 | 0.11 |
| Izod impact strength | J/m | 120 | 190 | 360 | 130 | 170 | 100 | 110 | 125 | 100 | 128 |
| Resistance to thermal creep | (Hrs) | 300 or more | 300 or more | 300 or more | 300 or more | 240 | 300 or more | 186 | 182 | 155 | 157 |
| Presence of HTR in boundary phase |  | Yes | Yes | Yes | Yes | Yes | Yes | Yes | Yes | Yes | Yes |

|  |  | Comparative Example 11 | Comparative Example 12 | Comparative Example 13 | Comparative Example 14 | Comparative Example 15 | Comparative Example 16 | Comparative Example 17 |
|---|---|---|---|---|---|---|---|---|
| Component (a) (a-1) | Parts by weight |  |  |  | 100 | 100 | 100 | 100 |
| Component (a) (a-2) | Parts by weight |  |  |  |  |  |  |  |
| Component (a) (a-3) | Parts by weight |  |  | 100 |  |  |  |  |
| Component (a) (a-4) | Parts by weight | 100 |  |  |  |  |  |  |
| Component (a) (a-5) | Parts by weight |  | 100 |  |  |  |  |  |
| Component (b) (b-2-1) | Parts by weight | 5 |  |  |  | 5 | 5 | 12.5 |
| Component (b) (b-2-2) | Parts by weight |  |  |  |  |  |  |  |
| Component (b) (b-2-3) | Parts by weight |  |  | 5 | 5 |  |  |  |
| Component (c) (c-1) | Parts by weight | 2.5 | 2.5 |  |  | 12.5 | 5 |  |
| Component (c) (c-2) | Parts by weight |  |  |  | 7 |  |  |  |
| Water vapor permeability | [g/(m² · 24 Hrs)] | 0.21 | 0.16 | 0.12 | 0.11 | 0.29 | 0.19 | 0.11 |
| Izod impact strength | J/m | 110 | 80 | 100 | 44 | 320 | 190 | 38 |
| Resistance to thermal creep | (Hrs) | 15 | 6 | 58 | 71 | 12 | 110 | 300 or more |
| Presence of HTR in boundary phase |  | Yes | Yes | Yes | No | Yes | Yes | No |

*HTR in the above table denotes a hydrogenated block copolymer.

EFFECTS OF THE INVENTION

The composition of the present invention is excellent in the resistance to water vapor permeation, the resistance to thermal creep and the impact resistance as a material for a battery case for secondary battery.

What is claimed is:

1. A resin composition for a battery case for secondary battery consisting of:

(a) about 100 parts by weight of a polypropylene type resin having a density of propylene polymer portion of about 0.905 g/cm³ or more arid an MFR at 230° C. with a load of 21.18 N of about 0.1 to 12 g/10 min, composing a matrix phrase, (b) about 0.5 to 10 parts by weight of a hydrogenated block copolymer having a number average molecular weight of about 100,000 or more, in terms of polystyrene, as measured by gel permeation chromatography (GPC), and being obtained by hydrogenating a block copolymer comprising at least two polymer blocks A which mainly comprise vinyl aromatic compound units and at least one polymer block B which mainly comprises conjugated diene compound unit(s), wherein the bonded vinyl aromatic compound units has a content of 26 to 55 wt %, composing a dispersed phase polymer, which forms a boundary phase with the matrix phase (a).

2. The resin composition for a battery case for secondary battery according to claim 1, wherein the density of the propylene polymer portion of the polypropylene type resin of the component (a) is about 0.905 g/cm$^3$ or more and the MFR of the polypropylene type resin is about 0.1 to 5 g/10 min.

3. The resin composition for a battery case for secondary battery according to claim 1, wherein proportion of the component (b) is about 1 to 7 parts by weight.

4. The resin composition for a battery case for secondary battery according to claim 1, wherein number average molecular weight of the hydrogenated block copolymer of the component (b) is about 130,000, in terms of polystyrene, as measured by gel permeation chromatography (GPC).

5. The resin composition for a battery case for secondary battery according to claim 1, wherein the conjugated diene compound unit(s) in the block copolymer before the hydrogenation for obtaining the hydrogenated block copolymer of the component (b) are butadiene unit(s).

6. The resin composition for a battery case for secondary battery according to claim 4, wherein the conjugated diene compound unit(s) in the block copolymer before the hydrogenation for obtaining the hydrogenated block copolymer of the component (b) are butadiene unit(s).

7. A battery case for secondary battery, which directly accommodates therein an electrode and a separator and is formed of a resin composition of claim 1.

8. The battery case for secondary battery according to claim 7, wherein the density of the propylene polymer portion of the polypropylene type resin of the component (a) is about 0.905 g/cm$^3$ or more and MFR of the polypropylene type resin is about 0.1 to 5 g/10 min.

9. The battery case for secondary battery according to claim 7, which is a battery case for enclosed secondary battery.

10. The battery case for secondary battery according to claim 8, which is a battery case for enclosed secondary battery.

* * * * *